(12) United States Patent
Huang

(10) Patent No.: US 7,657,974 B2
(45) Date of Patent: Feb. 9, 2010

(54) KNOB STRUCTURE

(75) Inventor: Yu-Cheng Huang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 521 days.

(21) Appl. No.: 11/511,264

(22) Filed: Aug. 29, 2006

(65) Prior Publication Data

US 2008/0078054 A1     Apr. 3, 2008

(51) Int. Cl.
*E05B 1/00* (2006.01)
(52) U.S. Cl. ...................................................... 16/441
(58) Field of Classification Search ............. 16/441, 16/414, 417, DIG. 18, DIG. 30; 200/315, 200/316, 317, 308; 257/158, 163; 74/553, 74/527, 548; 362/23, 26, 29–30, 100, 501; 345/184; 116/309, 310, 279, 286, 287, 284, 116/302, 304
See application file for complete search history.

(56) References Cited

U.S. PATENT DOCUMENTS

| | | | | |
|---|---|---|---|---|
| 2,288,955 A | * | 7/1942 | Richardson et al. | 464/36 |
| 2,840,672 A | * | 6/1958 | Martin | 200/565 |
| 3,198,923 A | * | 8/1965 | Tripp | 200/308 |
| 3,385,116 A | * | 5/1968 | Carlson et al. | 74/10.54 |
| 3,517,570 A | * | 6/1970 | Kolb | 74/527 |
| 3,570,325 A | * | 3/1971 | Kroll et al. | 74/525 |
| 3,662,618 A | * | 5/1972 | Kroll et al. | 74/527 |
| 4,539,444 A | * | 9/1985 | Senoh | 200/5 R |
| 6,225,580 B1 | * | 5/2001 | Lemire | 200/11 DA |

FOREIGN PATENT DOCUMENTS

| | | | |
|---|---|---|---|
| JP | 08106336 A | * | 4/1996 |
| JP | 08315660 A | * | 11/1996 |

* cited by examiner

*Primary Examiner*—Chuck Y. Mah
(74) *Attorney, Agent, or Firm*—Rosenberg, Klein & Lee

(57) ABSTRACT

A knob structure includes a holder, a steel ball, an elastic metallic piece, a swiveling element and a connecting element. The holder has at least one through hole. The steel ball is slidably placed inside the through hole. The elastic metallic piece and the swiveling element reside at either sides of the holder. The elastic metallic piece slidably lies against the steel ball. The swiveling element has a sliding portion which has a plurality of notches spaced at intervals. The sliding portion slidably lies against the steel ball so that the steel ball slides into or out of the notches by turning the swiveling element. The steel ball has a smooth surface and is in point-to-point contact with the sliding portion and with the elastic metallic piece. Therefore, frictions therebetween are so small that no scraps generate due to the frictional operation.

6 Claims, 4 Drawing Sheets

KNOB STRUCTURE

BACKGROUND OF THE INVENTION

1. Field of the Invention

The invention generally relates to a knob structure, and more particularly to a knob structure which creates a feeling of segments when turns.

2. Description of the Related Art

Taiwan patent No. I254957 (publication date: May 11, 2006) discloses an electronic device with a knob structure includes a casing with the knob structure thereon. The knob structure includes a first turning element having a first protrusion; a second turning element connecting to the first turning element in a way that the first turning element turns as the second turning element turns; a moving element which moves between the first and second turning elements and has a second protrusion matching the first protrusion for stopping the moving element in a idle position; and an elastic element which locates between the moving element and the second turning element and is used to return the moving element to the idle position by apply an elastic force. When the first turning element turns, the moving element moves due to the relative movement of the first protrusion and the second protrusion. When the first turning element stops working and the moving element returns to the idle position, the first protrusion substantially engages with the second protrusion.

In the conventional knob structure above, the relative movement of the first protrusion of the first turning element and the second protrusion of the moving element creates a feeling of segments. However, great contact area between the first protrusion and the second protrusion forms great friction in operation. Furthermore, the first turning element and the moving element are both made of plastics which would form plastic scraps due to the frictional operation.

Therefore, there is a need of an improved knob structure which solves the above problems. The inventors have intensively studies over the need and finally provide a new knob structure which overcomes the prior disadvantages.

SUMMARY OF THE INVENTION

It is one of objects of the invention to provide a knob structure in which less friction generates in operation compared to conventional ones, and no scraps generate while a feeling of segments is created.

In order to achieve the above and other objectives of the invention, the knob structure of the invention includes a holder, having at least one through hole; a steel ball, slidably placed inside the through hole; an elastic metallic piece, residing at one side of the holder and slidably lying against the steel ball; a swiveling element, locating at the other side of the holder opposite to the elastic metallic piece, wherein the swiveling element has a sliding portion which has a plurality of notches spaced at intervals, and wherein the sliding portion slidably lies against the steel ball so that the steel ball slides into or out of the notches by turning the swiveling element; and a connecting element, connecting to the swiveling element and the elastic metallic piece.

To provide a further understanding of the invention, the following detailed description illustrates embodiments and examples of the invention, this detailed description being provided only for illustration of the invention.

DETAILED DESCRIPTION OF THE EMBODIMENTS

Figure 1:
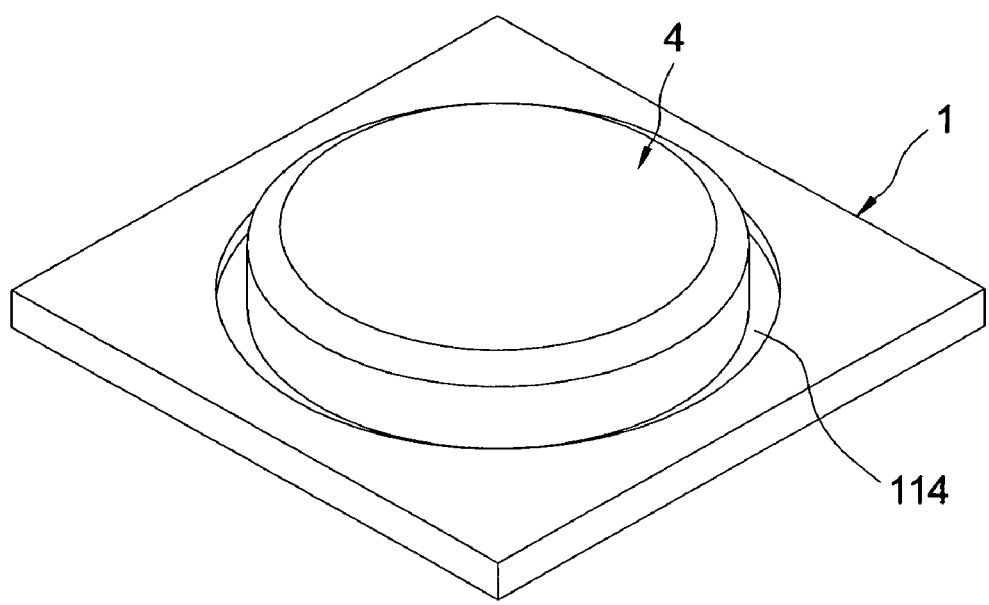
FIG. 1 is a perspective view of a knob structure according to one embodiment of the invention.

Wherever possible in the following description, like reference numerals will refer to like elements and parts unless otherwise illustrated.

Figure 2:
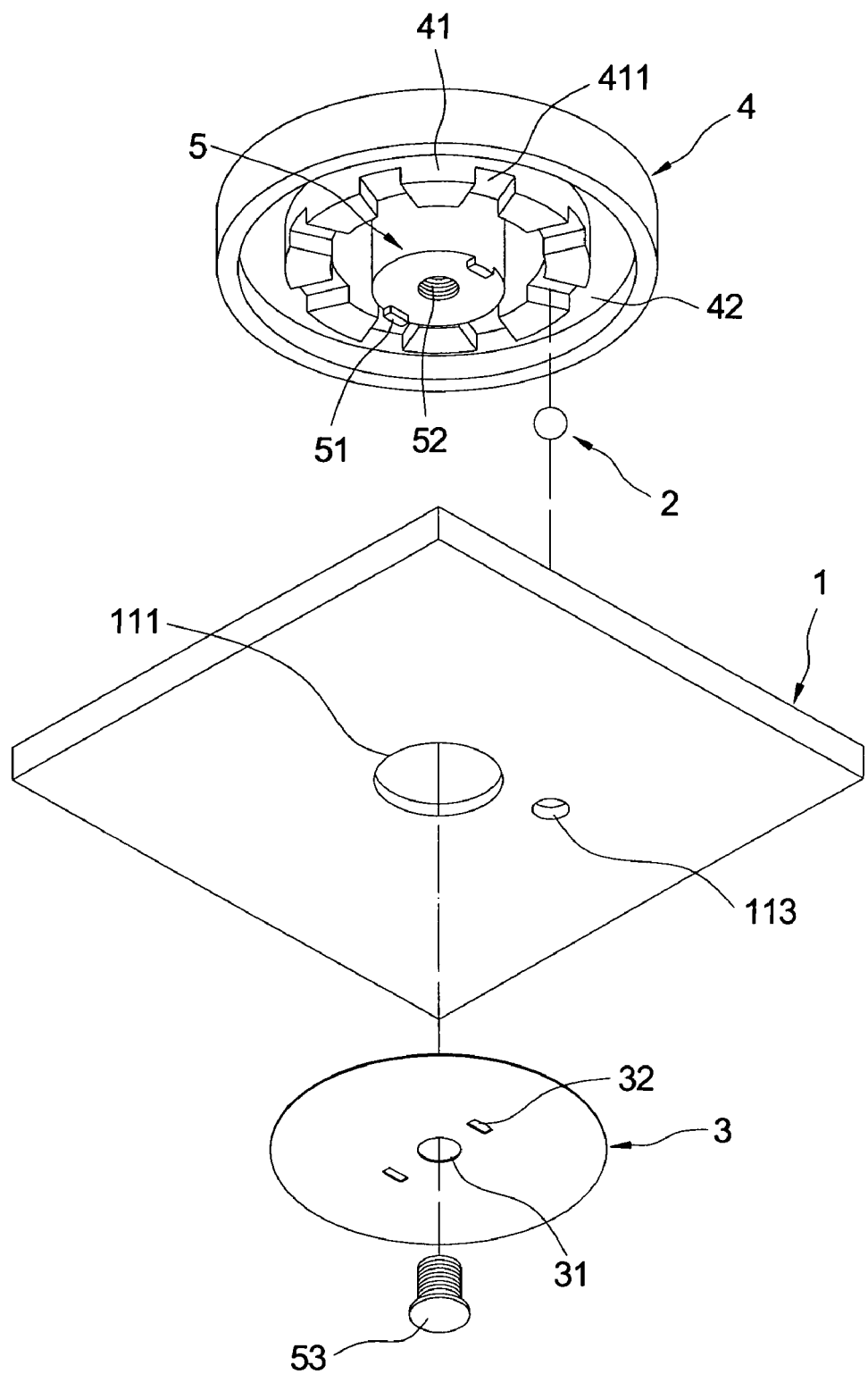
FIG. 2 is an exploded view of a knob structure according to one embodiment of the invention.
Figure 3:
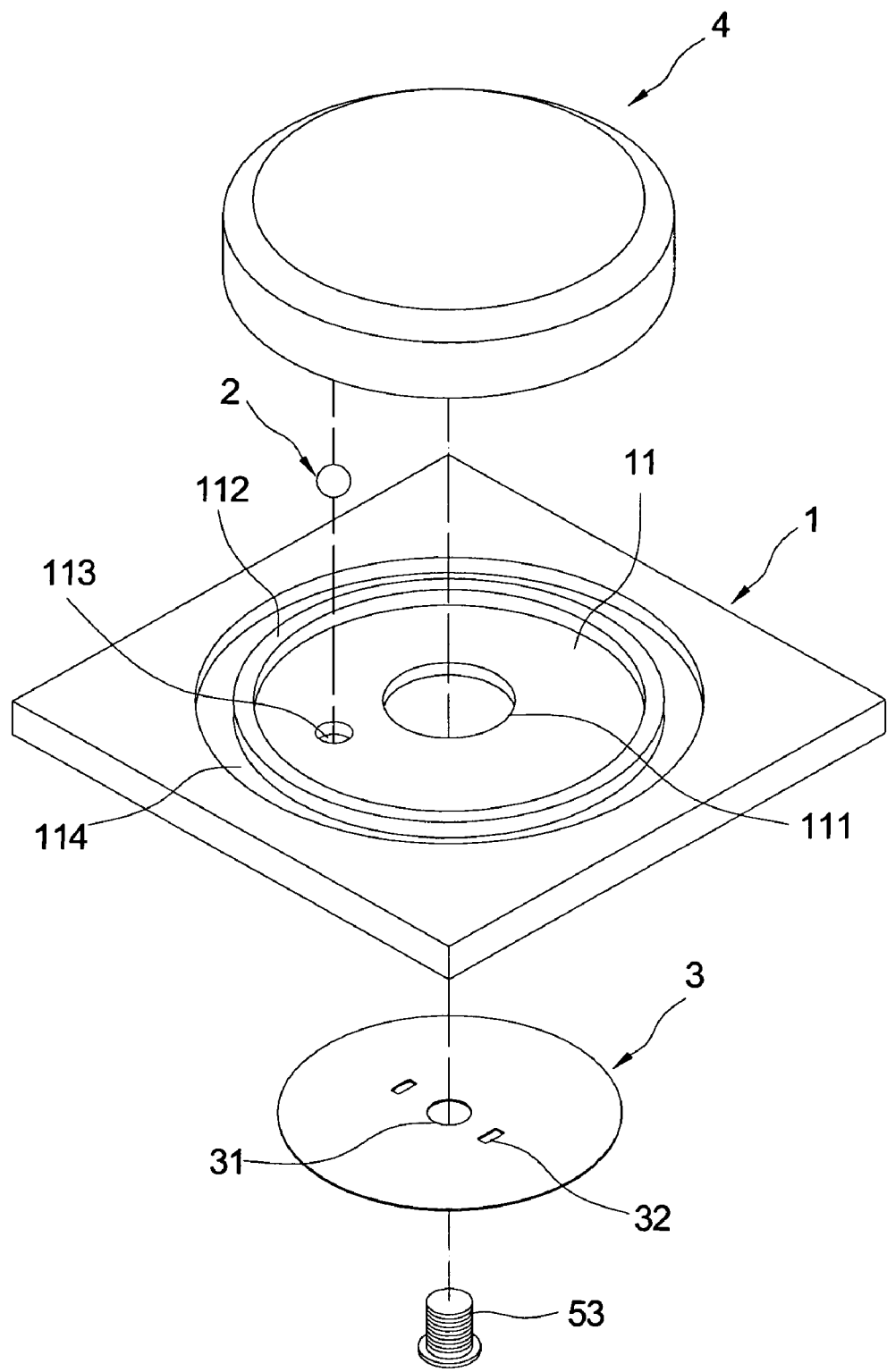
FIG. 3 is an exploded view of a knob structure, taken in a different angle of view from FIG. 2, according to one embodiment of the invention.
Figure 4A:
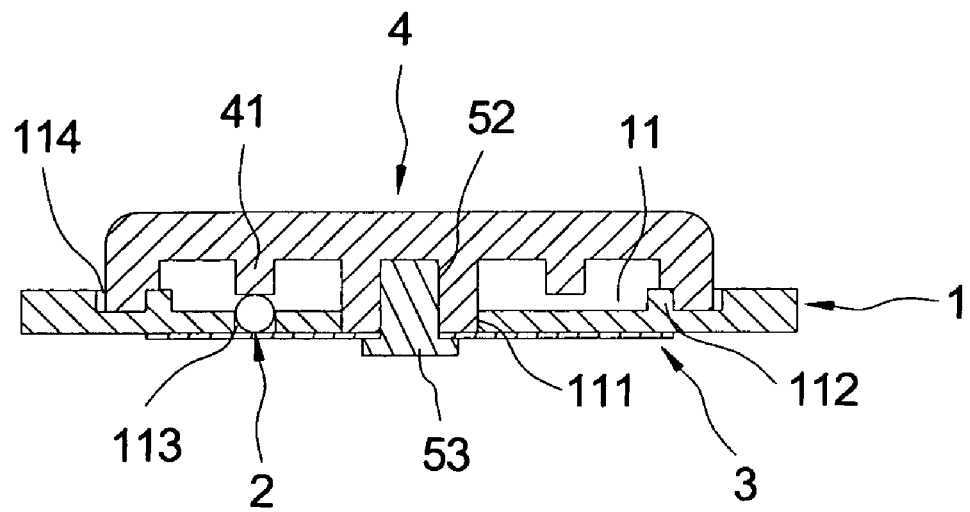
FIG. 4A shows a status of a knob structure in operation according to one embodiment of the invention.
Figure 4B:
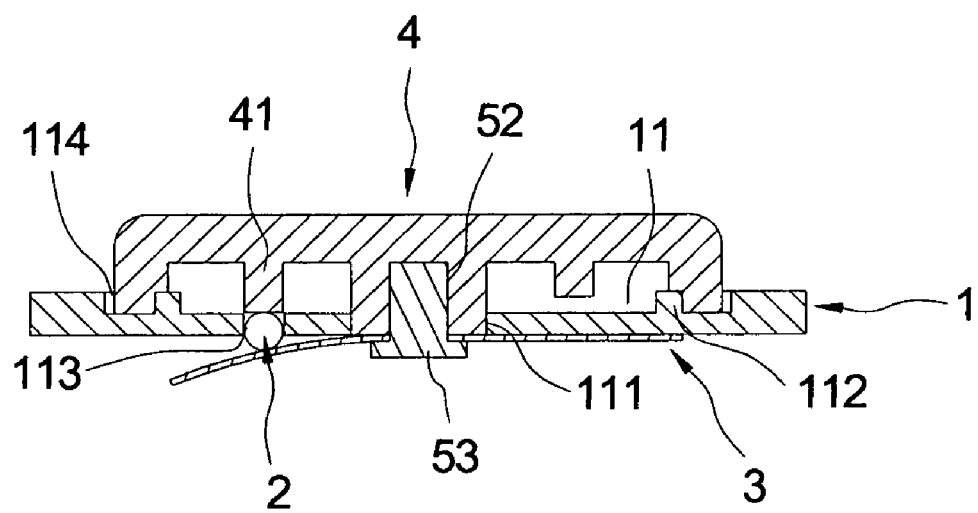
FIG. 4B shows another status of a knob structure in operation according to one embodiment of the invention.

Referring to FIG. 1, FIG. 2, FIG. 3, FIG. 4A and FIG. 4B, the invention provides a knob structure mounted on an electronic device, in which the knob structure can be manually driven to switch its operation modes. The knob structure includes a holder 1, a steel ball 2, an elastic metallic piece 3, a swiveling element 4 and a connecting element 5.

The holder 1 is in form of flat plate and has a recess 11 at its top. The recess 11 has a positioning hole 111 through the whole recess 11, a guide ring 112 and a through hole 113. The positioning hole 111 locates at a center of the recess 11. The guide ring 112 forms around the positioning hole 111 on an inner wall of the recess 11 in a manner that a caved groove 114 forms between the guide ring 112 and the inner wall of the recess 11. The through hole 113 locates between the positioning hole 111 and the guide ring 112. The steel ball 2 is slidably placed inside the through hole 113.

The elastic metallic piece 3 is in round shape and resides under the holder 1. The elastic metallic piece 3 slidably lies against a lower edge of the steel ball 1 to provide an upward support for the steel ball 2. The elastic metallic piece 3 has a through hole 31 and two engagement grooves 32. The through hole 31 locates at a center of the elastic metallic piece 3. The two engagement grooves 32 oppositely locate outside the through hole 31.

The swiveling element 4 is a hollow lid. An open end of the swiveling element 4 slidably covers the caved groove 114 of the recess 11. A sliding portion 41 is mounted around an interior of the swiveling element 4, with a guide groove 42 between the sliding portion 41 and the swiveling element 4. The guide groove 42 matches the guide ring 112 of the holder 1 so that the open end of the swiveling element 4 stably slides along the caved groove 114 when the swiveling element 4 works.

The sliding portion 41 slidably moves along an upper edge of the steel ball 2 to provide a downward pressure against the steel ball 2. The sliding portion 41 has a plurality of notches spaced at intervals. The steel ball 2 slides into or out of the notches 411 by means of turning the swiveling element 4 to create a feeling of segments.

The connecting element 5 is in shape of column, and formed integrally with the swiveling element 4 at an inner center of the swiveling element 4.

The connecting element 5 penetrates through the positioning hole 111 of the holder 1. Two protruding blocks 51 are formed on a bottom surface of the connecting element 5. One screw hole 52 is formed through the connecting element 5. By engaging the two protruding blocks 51 with the engagement grooves 32 of the elastic metallic piece 3 and fixing a screw 53 to the screw hole 52 through the through hole 31 of the elastic metallic piece 3, the elastic metallic piece 3 fixedly connects to the connecting element 5 in a manner that the connecting element 5 locates between the swiveling element 4 and the elastic metallic piece 3 so that the elastic metallic piece 3 turns as the swiveling element 4 swivels.

When in use, the swiveling element 4 can be driven manually to make the steel ball 2 slide against the swiveling element 4 and the elastic metallic piece 3. When the steel ball 2 slides out of the notches of the sliding portion 41, the sliding portion 41 applies pressure against the upper edge of the steel ball 2 to force the steel ball 2 to move downward and accordingly the elastic metallic piece 3 in contact with the lower edge of the steel ball 2 deforms downward. When the steel ball 2 slides into the notches 411 of the sliding portion 41, the pressure applied against the upper edge of steel ball 2 by the sliding portion 41 reduces so that the steel ball 2 moves upward and the elastic metallic piece 3 in contact with the lower edge of the steel ball 2 restores to its original state. The change of the applied force over the steel ball 2 and the elastic metallic piece 3 creates a feeling of segments.

The steel ball 2 used in the invention has a smooth surface and is in point-to-point contact with the sliding portion 41 of the swiveling element 4 and with the elastic metallic piece 3. Therefore, frictions between the steel ball 2 and the sliding portion 41 and between the steel ball 2 and the elastic metallic piece 3 are so small that no scraps generate due to the frictional operation. Furthermore, the change of force applied against the steel ball 2 and the elastic metallic piece 3 by sliding the steel ball 2 into and out of the notches 411 of the sliding portion 41 creates a feeling of segments.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A knob structure, comprising:
   a holder, having at least one through hole and a positioning hole;
   a steel ball, slidably disposed in the through hole;
   an elastic metallic piece, located on one side of the holder and slidably lying against the steel ball;
   a knob, located at the other side of the holder opposite to the elastic metallic piece, wherein the knob has a sliding portion which has a plurality of notches spaced at intervals, the sliding portion slidably lies against the steel ball so that the steel ball slides into or out of the notches as the knob rotates relative to the holder; and
   a connecting element, passed through the positioning hole of the holder, the connecting element being coupled to the knob and lockingly connected to the elastic metallic piece for rotation with the knob relative to the holder.

2. The knob structure of claim 1, wherein the holder has a recess at its top, the recess having a guide ring and a caved groove, the caved groove being formed between the guide ring and an inner wall of the recess, the knob having a guide groove formed between the sliding portion and an inner side of a perimeter wall of the knob, the perimeter wall of the knob is received in the caved groove and the guide ring is received in the guide groove.

3. The knob structure of claim 1, wherein the elastic metallic piece has at least one engagement groove, and the connecting element has at least one protruding block, the protruding block being engaged with the engagement groove.

4. The knob structure of claim 1, wherein the connecting element is formed integrally with the knob and has a screw hole, a screw being passed through the elastic metallic piece and engaged with the screw hole to fix the elastic metallic piece to the connecting element.

5. A knob structure, comprising:
   a holder having at least one through hole, a positioning hole and a recess formed on one side thereof, the recess having a guide ring and a caved groove, the caved groove being formed between the guide ring and an inner side of a wall circumscribing the recess;
   a steel ball slidably disposed in the through hole;
   an elastic metallic piece disposed on an opposing side of the holder and slidably lying against the steel ball;
   a knob located on the one side of the holder opposite to the elastic metallic piece, the knob having a sliding portion formed with a plurality of notches spaced at intervals, the knob having a guide groove formed between the sliding portion and an inner side of a perimeter wall of the knob, the perimeter wall being received in the caved groove of the holder and the guide ring being received in the guide groove of the holder, the sliding portion slidably lies against the steel ball so that the steel ball slides into or out of the notches responsive to the knob being rotated by the holder; and
   a connecting element coupled to the knob and passed through the positioning hole of the holder, the connecting element being lockingly connected to the elastic metallic piece for rotation with the knob relative to the holder.

6. A knob structure, comprising:
   a holder having at least one through hole and a positioning hole;
   a steel ball slidably placed inside the through hole;
   an elastic metallic piece disposed on one side of the holder and slidably lying against the steel ball, the elastic metallic piece having at least one engagement groove formed therein;
   a knob disposed on an opposing side of the holder opposite to the elastic metallic piece, the knob having a sliding portion formed with a plurality of notches spaced at intervals, the sliding portion slidably lies against the steel ball so that the steel ball slides into or out of the notches responsive to the knob being rotated relative to the holder; and
   a connecting element coupled to the knob and passed through the positioning hole of the holder, the connecting element having at least one protruding block extending therefrom and being engaged with the engagement groove of the elastic metallic piece to lockingly connect the elastic metallic piece thereto for rotation with the knob relative to the holder.

* * * * *